United States Patent
Huang et al.

(10) Patent No.: US 8,384,590 B2
(45) Date of Patent: Feb. 26, 2013

(54) SYSTEM AND METHOD FOR TIME SYNCHRONIZATION

(75) Inventors: Polly Huang, Taipei (TW); Seng-Yong Lau, Taipei (TW); Ling-Jyh Chen, Taipei (TW); Jyh-How Huang, Taipei (TW)

(73) Assignee: National Taiwan University, Taipei (TW)

( * ) Notice: Subject to any disclaimer, the term of this patent is extended or adjusted under 35 U.S.C. 154(b) by 183 days.

(21) Appl. No.: 12/967,699

(22) Filed: Dec. 14, 2010

(65) Prior Publication Data
US 2012/0050100 A1    Mar. 1, 2012

(30) Foreign Application Priority Data
Aug. 27, 2010   (TW) .............................. 099128798 A (51) Int. Cl.
*G01S 19/23*   (2010.01)
*G01S 19/03*   (2010.01)

(52) U.S. Cl. ................................ 342/357.62; 342/357.4
(58) Field of Classification Search ............. 342/357.31, 342/357.4, 357.62, 357.74; 701/468, 469
See application file for complete search history.

(56) References Cited

U.S. PATENT DOCUMENTS

| | | |
|---|---|---|
| 7,496,059 B2 | 2/2009 | Yoon |
| 2005/0275532 A1 | 12/2005 | Ferri et al. |
| 2009/0323669 A1 | 12/2009 | Salonidis et al. |

*Primary Examiner* — Dao Phan
(74) *Attorney, Agent, or Firm* — Muncy, Geissler, Olds & Lowe, PLLC (57) ABSTRACT

The present invention relates to a system, and a method for time synchronization with low power consumption and high accuracy. The system comprises a plurality of devices for time synchronization. Each device comprises a GPS receiver, a microprocessor, and an oscillator. The microprocessor generates a drift per second according to the difference between the PPS signal and the clock signal, and calibrates the clock signal constantly according to drift per second. The GPS receiver is turned off when the drift per second is obtained, and then is turned on after a pre-determined time period for updating the drift per second.

15 Claims, 6 Drawing Sheets

SYSTEM AND METHOD FOR TIME SYNCHRONIZATION

FIELD OF THE INVENTION

The present invention generally relates to a device, a system, and a method for time synchronization and, more particularly, to a device, a system, and a method for time synchronization with low power consumption and high accuracy.

BACKGROUND OF THE INVENTION

On the Internet, multi-node linkage with TCP/IP protocols achieves reliable data transmission advantages such as continuous transmission, point-to-point transmission, low latency, low error rate, bi-directional and symmetric transmission, etc.

However, for some systems, such as resource limited mobile device network and wireless senor network, the Internet is not accessible for data transmission between nodes. Because of the limited resource or environment shielding, the nodes of the distributed systems cannot transmit data in real-time. Thus delay-tolerant networks (DTNs) attract tremendous attention in this field.

For opportunistic networks, the linkage quality is hard to control since interruption usually occurs. Under such circumstances, the connection between nodes should be re-constructed, and data should be repeatedly transmitted from the source to the destination. TCP/IP protocols are not suitable for such networks. To operate such opportunistic networks, high power consumption has become a major issue due to data retransmission if nodes are independent resource limited devices.

For wireless sensor networks, a plurality of wireless sensors are distributed in the environment or disposed on the target object to detect the environmental parameters, the target object or the difference of the target object. Such data is processed and then is transmitted to the base station by wireless communication.

The sensors are usually powered by batteries. Due to limited power supply and transmission range, sensors of wireless sensor networks transmit data to the base station via the routing of multiple-hop relay. To reduce power consumption, the time for data transmission between the sensors should be shortened; packet collision during data transmission and data retransmission should be prevented.

Accordingly, time division multiple access (TDMA) technology may not be available for data transmission between distributed and independent sensors because that it is difficult to have time synchronized between the sensors. Therefore, time synchronization is crucial for distributed and independent devices.

SUMMARY OF THE INVENTION

It is one objective of the present invention to provide a device, a system, and a method for time synchronization with low power consumption and high accuracy.

It is another objective of the present invention to provide a device for time synchronization that calibrates the clock signal according to a PPS signal generated by a GPS receiver.

It is still another objective of the present invention to provide a device for time synchronization using a GPS receiver is turned on periodically and turned off while completes calibration for reducing power consumption.

It is still another objective of the present invention to provide a method for time synchronization that calibrates the clock signal according to a drift per second of the clock signal.

It is still another objective of the present invention to provide a device for time synchronization comprising a PPS filter for filtering a proper PPS signal to calibrate the clock signal.

It is still another objective of the present invention to provide a system comprising a plurality of devices for time synchronization, wherein devices transmit and receive data by TDMA technology.

It is still another objective of the present invention to provide a system comprising a plurality of devices for time synchronization, wherein devices transmit and receive data by TDMA technology to prevent packet collision and shorten the time for data transmission.

It is still another objective of the present invention to provide a system comprising a plurality of devices for time synchronization that is capable of tracking the trajectory of each of the devices according to the positioning information.

It is still another objective of the present invention to provide a method for time synchronization that calibrates the clock signal according to the PPS signal.

It is still another objective of the present invention to provide a method for time synchronization wherein a compensation per second is obtained for calibrating the clock signal after the GPS receiver is turned on and the location is determined.

To achieve the above objectives, the present invention provides a system comprising a plurality of devices for time synchronization, wherein each device comprises: a global positioning system (GPS) receiver for receiving GPS signals to determine location and generate positioning information and a pulse per second (PPS) signal; an oscillator for generating a periodic signal; a microprocessor coupled to the GPS receiver and the oscillator for receiving the PPS signal and the periodic signal, the microprocessor comprising a timer for generating a clock signal according to the periodic signal; wherein the microprocessor generates a drift per second according to the difference between the PPS signal and the clock signal; and a wireless transceiver coupled to the microprocessor for transmitting the positioning information to the other devices and receiving positioning informations from the other devices; wherein the microprocessor turns off the GPS receiver and calibrates the clock signal constantly according to the drift per second, and then the GPS receiver is turned on after a pre-determined time period to update the drift per second and calibrate the clock signal with the updated drift per second, thereby forming cycle.

The present invention further provides a method for time synchronization, comprising steps of providing a global positioning system (GPS) receiver for receiving GPS signals to determine location and generate a pulse per second (PPS) signal; providing an oscillator for generating a periodic signal; and providing a microprocessor coupled to the GPS receiver and the oscillator for generating a clock signal according to the periodic signal; calculating a drift per second according to the difference between the PPS signal and the clock signal; turning off the GPS receiver; and calibrating the clock signal constantly according to the drift per second.

BRIEF DESCRIPTION OF THE DRAWINGS

The objectives and spirits of the embodiments of the present invention will be readily understood by the accompanying drawings and detailed descriptions, wherein.

DETAILED DESCRIPTION OF THE PREFERRED EMBODIMENTS

The present invention can be exemplified but not limited by various embodiments as described hereinafter.

Figure 1:
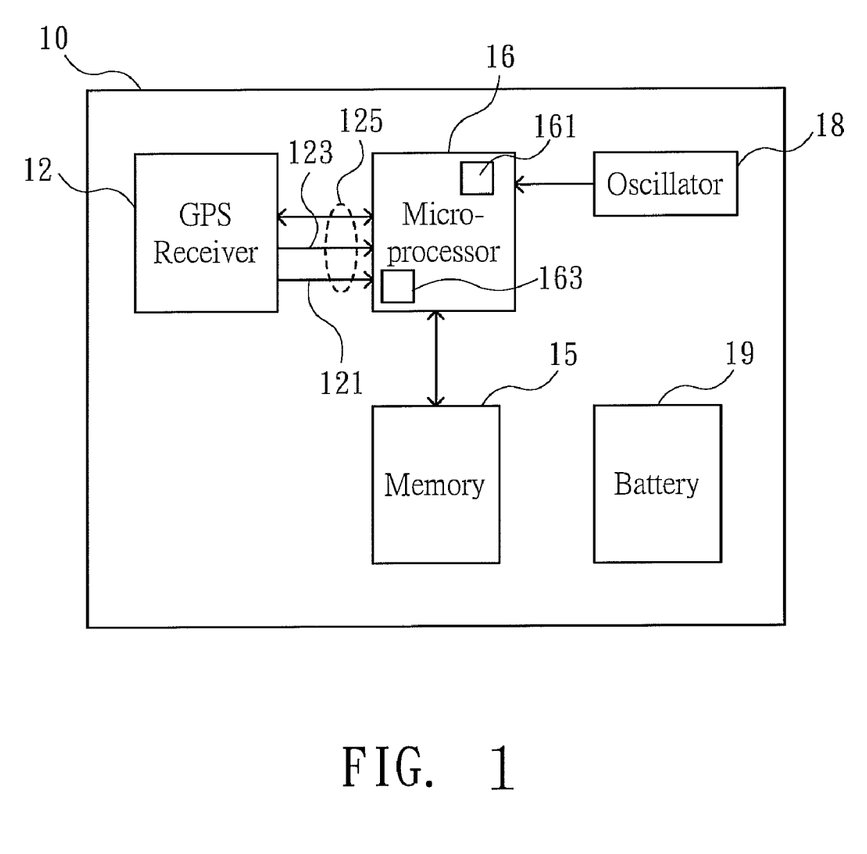
FIG. 1 is a schematic diagram of a device for time synchronization in accordance with one embodiment of the present invention.

Please refer to FIG. 1 for a schematic diagram of a device for time synchronization in accordance with one embodiment of the present invention. The device 10 for time synchronization of the present invention comprises a global positioning system (GPS) receiver 12, a microprocessor 16 and an oscillator 18.

The GPS receiver 12 receives GPS signals to determine location, and generates a pulse per second (PPS) signal after location is determined. The PPS signal is a periodic pulse signal having a width of 100-ms, each rising edge of the pulse indicates the start of a second with the accuracy of ±10 ns.

The GPS receiver 12 is connected with the microprocessor 16 by a control and data bus 125. The control and data bus 125 comprises a 3D fixes signal line 123 and a PPS signal line 121. When the location is determined, a 3D fixes signal is transmitted from the 3D fixes signal line 123 to the microprocessor 16. The microprocessor 16 is triggered to receive the PPS signal and positioning information according to the 3D fixes signal. The positioning information comprises: the time when the location is determined, coordinates, and altitude.

The oscillator 18 is a quartz oscillator for generating a periodic signal. The microprocessor 16 comprises a timer 161 for generating a clock signal according to the periodic signal. The clock signal is a timing reference of the device.

In the present invention, the microprocessor 16 calculates a drift per second according to the difference between the PPS signal and the clock signal generated by the microprocessor 16. The clock signal is calibrated according to the drift per second constantly so as to achieve time synchronization for all the devices. Taking the accuracy of the PPS signal, the accuracy of the oscillator 18 and the operation efficiency of the microprocessor 16 into consideration, time synchronization with accuracy of microsecond degree can be achieved after the clock signal has been calibrated.

The disclosed structure of the present invention can be used in the device 10 for time synchronization that is powered by a battery 19. The GPS receiver 12 consumes relatively high power in small device that is powered by a battery. Therefore, to reduce power consumption, the GPS receiver 12 is turned off after the drift per second of the clock signal has been obtained. In the present invention, the clock signal is calibrated constantly according to the drift per second when the GPS receiver 12 is turned off.

Since the oscillating frequency of an oscillator 18 may vary with time and temperature, the microprocessor 16 calculates a drift per second according to the difference between the clock signal and the PPS signal, and calibrates the clock signal constantly according to the drift per second. The GPS receiver 12 is preferably turned on after a pre-determined time period to generate PPS signal again. The clock signal is calibrated again according to the drift per second that is updated by new PPS signal.

Experimentally, the PPS signal generated right after the GPS receiver 12 is turned on is not stable. In other words, such PPS signal may result in lower accuracy as compared with the PPS signal generated by a continuously operating GPS receiver. Therefore, the microprocessor 16 may further comprise a PPS filter 163 for checking the PPS signals to select a proper PPS signal for the microprocessor 16 to calibrate the clock signal.

Moreover, the device 10 for time synchronization may further comprise a memory 15 coupled to the microprocessor 16 for storing data.

Figure 2:
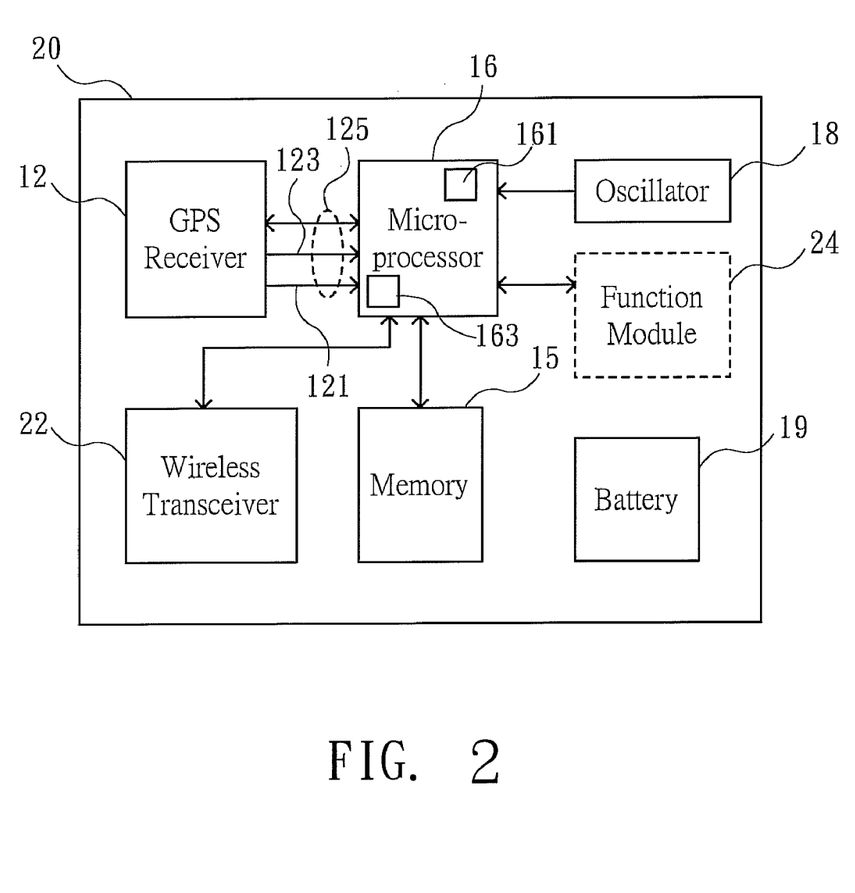
FIG. 2 is a schematic diagram of the device of a system in accordance with one embodiment of the present invention.

Please refer to FIG. 2 for a schematic diagram of the device of a system in accordance with one embodiment of the present invention. The disclosed structure of the present invention can be used in a system using devices for time synchronization.

In FIG. 2, the device 20 for time synchronization is similar to the device 10 for time synchronization in FIG. 1 except that the device 20 further comprises a wireless transceiver 22 coupled to the microprocessor 16 to perform data transmission with other devices 20 in the system.

Since the devices for time synchronization of the present invention achieve accuracy of microsecond degree, time division multiple access (TDMA) technology can be adopted for data transmission when such devices of the present invention are used in distributed systems such as wireless sensor networks or opportunistic networks to prevent data retransmission due to data packet collision or poor transmission quality.

Moreover, the device 20 for time synchronization may further comprise a function module 24 coupled to the microprocessor 16 to achieve a specific function. After the location is determined, the positioning information from the GPS receiver 12 and the data from the function module 24 can be stored in the memory 15. When there is an opportunity for data transmission between the devices 20, the positioning information and the data stored in the memory 15 can be transmitted by TDMA technology.

Figure 3:
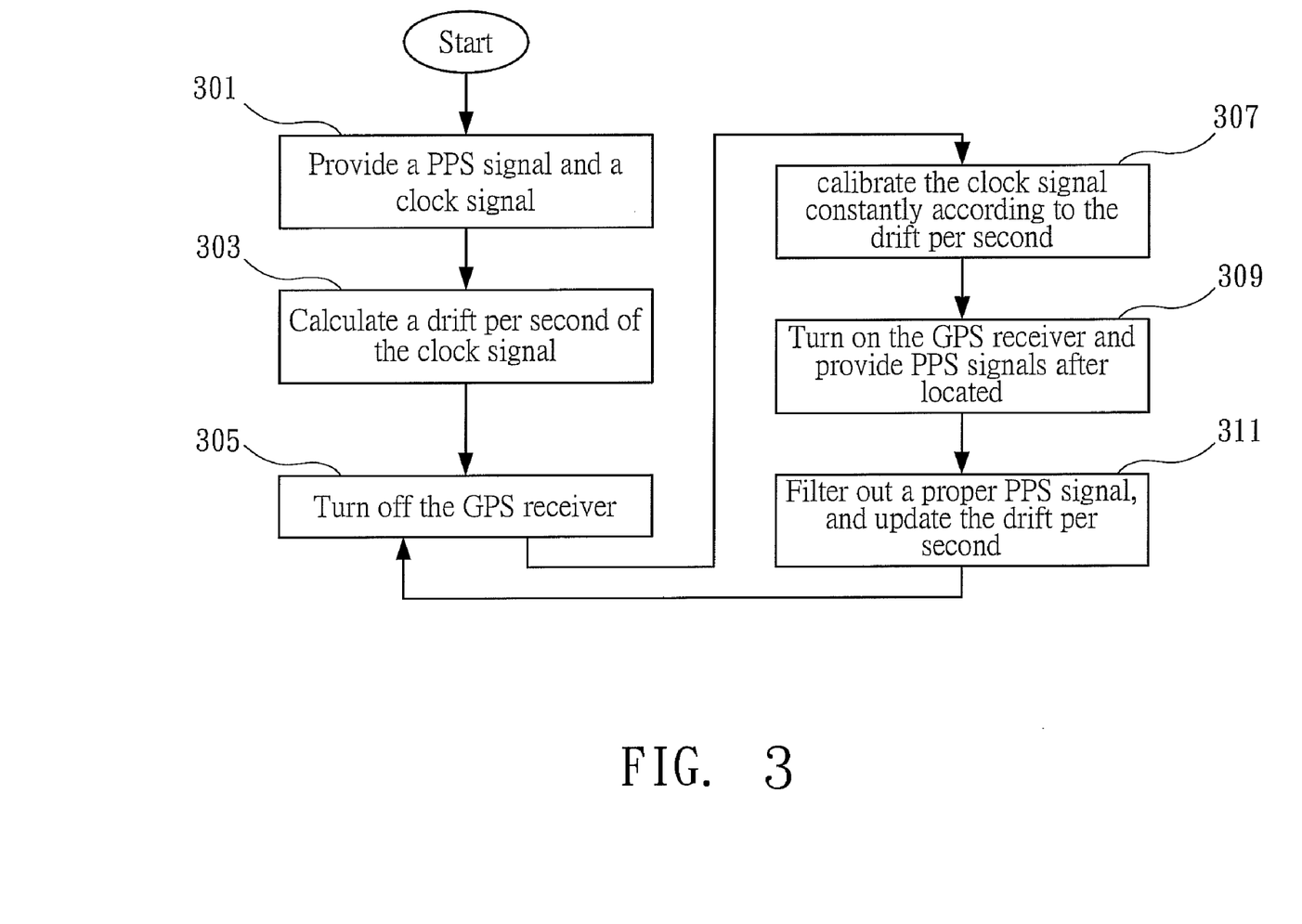
FIG. 3 is a flowchart of a method for time synchronization in accordance with one embodiment of the present invention.
Figure 4:
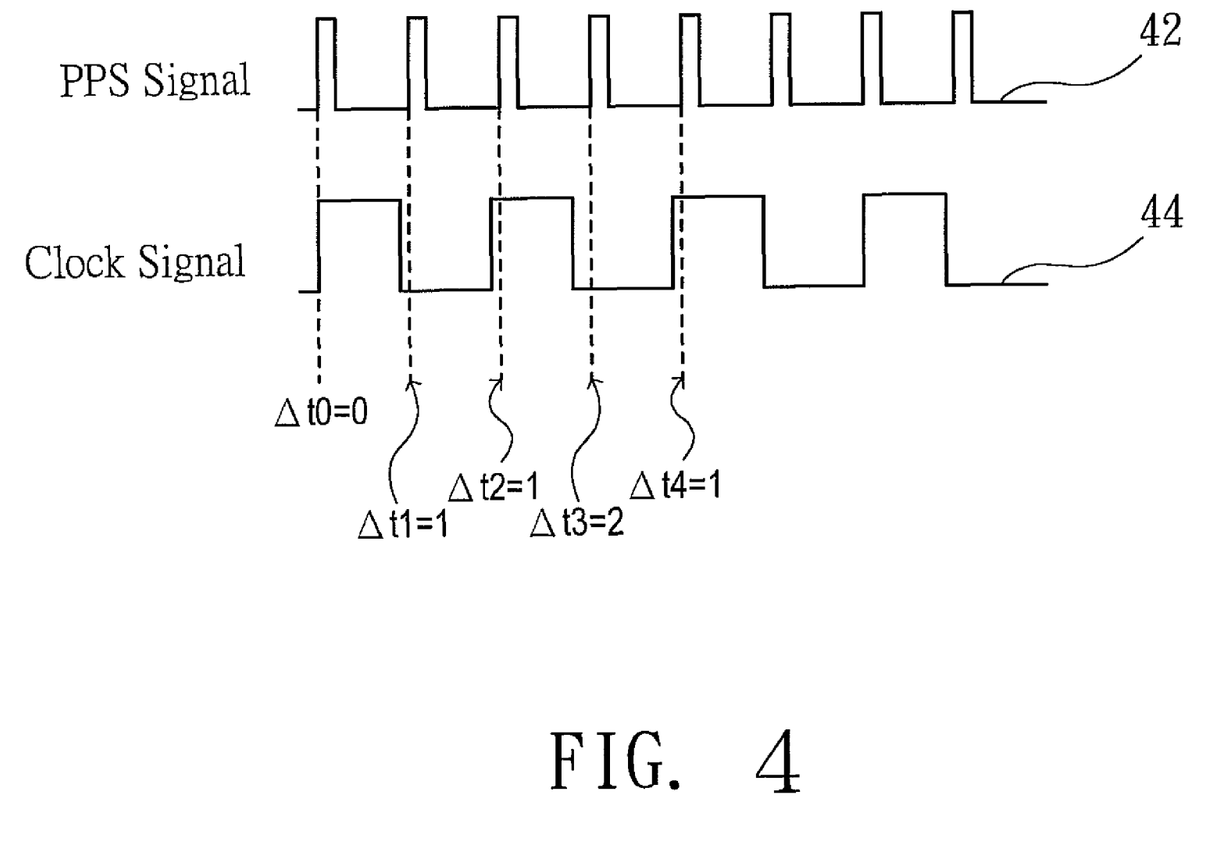
FIG. 4 is a diagram schematically showing a clock signal and a PPS signal in accordance with one embodiment of the present invention.
Figure 5:
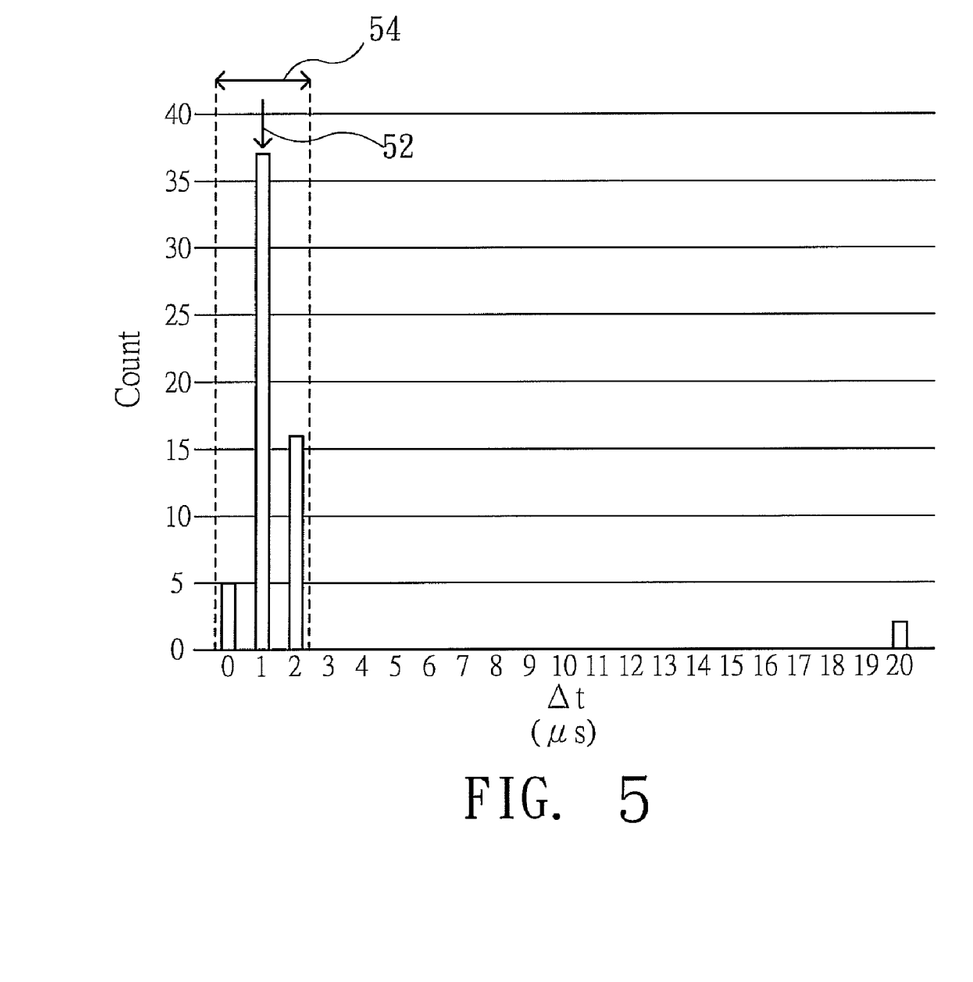
FIG. 5 is a graph schematically showing the drift distribution in accordance with one embodiment of the present invention.

Please refer to FIG. 3 to FIG. 5 for a flowchart of a method for time synchronization, a diagram schematically showing a clock signal and a PPS signal, and a graph schematically showing the drift distribution according to one embodiment of the present invention. After the GPS receiver 12 determines the location and comes into a stable state, the PPS signal 42 exhibits accuracy of ±10 ns. Accordingly, the PPS signal 42 can be used as a reference for calibrating the clock signal in most of systems.

As shown in FIG. 3, the method for time synchronization of the present invention starts with a step of providing a PPS signal and a clock signal from a GPS receiver and a microprocessor respectively, as shown in Step 301. The drift per second (DPS) of the clock signal is calculated according to the PPS signal, as shown in Step 303. Then, the GPS receiver can be turned off for reducing the power consumption, as shown in Step 305. The clock signal is calibrated constantly according to the drift per second, as shown in Step 307.

The drift per second is calculated with reference to FIG. 4 and FIG. 5. Since the oscillating frequency of an oscillator usually varies, the clock signal 44 generated according to the oscillator may vary. The drift per second of the clock signal 44 can be obtained by comparing the clock signal 44 and the PPS signal 42. For example, the drift of the origin of the clock signal Δt0 is 0, and the drift of the fourth second Δt4 is 1 with the unit of μs.

After comparing for a time period (for example, 60 seconds), a drift Δt distribution can be obtained, as shown in FIG. 5. The drift 52 with the highest count is chosen as the center. In the present embodiment, the drift with the highest count is 1 microsecond. The center is used as a reference to define a main drift range 54. In the present embodiment, the main drift range 54 is extended from the center by two microseconds.

The sum of all the drifts in the main drift range 54 is calculated and then is divided by the time period (60 seconds) to obtain a drift per second.

After the drift per second is obtained, the GPS receiver is turned off for reducing power consumption, as shown in Step 305. The clock signal is calibrated constantly according to the drift per second to compensate the drift of the clock signal due to the deviation of the quartz oscillator, as shown in Step 307. To maintain the accuracy of the clock signal, the GPS receiver is turned on after a pre-determined time period to determine location again and generate updated PPS signals, as shown in step 309.

Since the PPS signals generated right after the GPS receiver is turned on is not stable, it is necessary to filter out a proper PPS signal for calculating an updated drift per second, as shown in Step 311. After the updated drift per second is obtained, the GPS receiver is turned off again, as shown in Step 305, and forming cycle.

The methods for filtering the PPS signal and calculating the updated drift per second will be discussed later with reference to FIG. 6.

After the GPS receiver is turned off, the clock signal is calibrated constantly according to the drift per second. For example, the clock signal generated by the microprocessor changes its state every second with one rising edge or one falling edge. The clock signal is calibrated according to the drift per second whenever the state is changed until a next cycle (an updated PPS signal is issued). After a compensation per second (CPS), i.e. an updated drift per second, is obtained, the clock signal is calibrated according to the updated drift per second. Furthermore, the time interval for state changing of the clock signal can be determined by the designer, for example, one second, 0.3 second or 0.1 second. When the clock signal changes its state every time interval, the clock signal is calibrated according to the corresponding average drift of the time interval.

Figure 6:
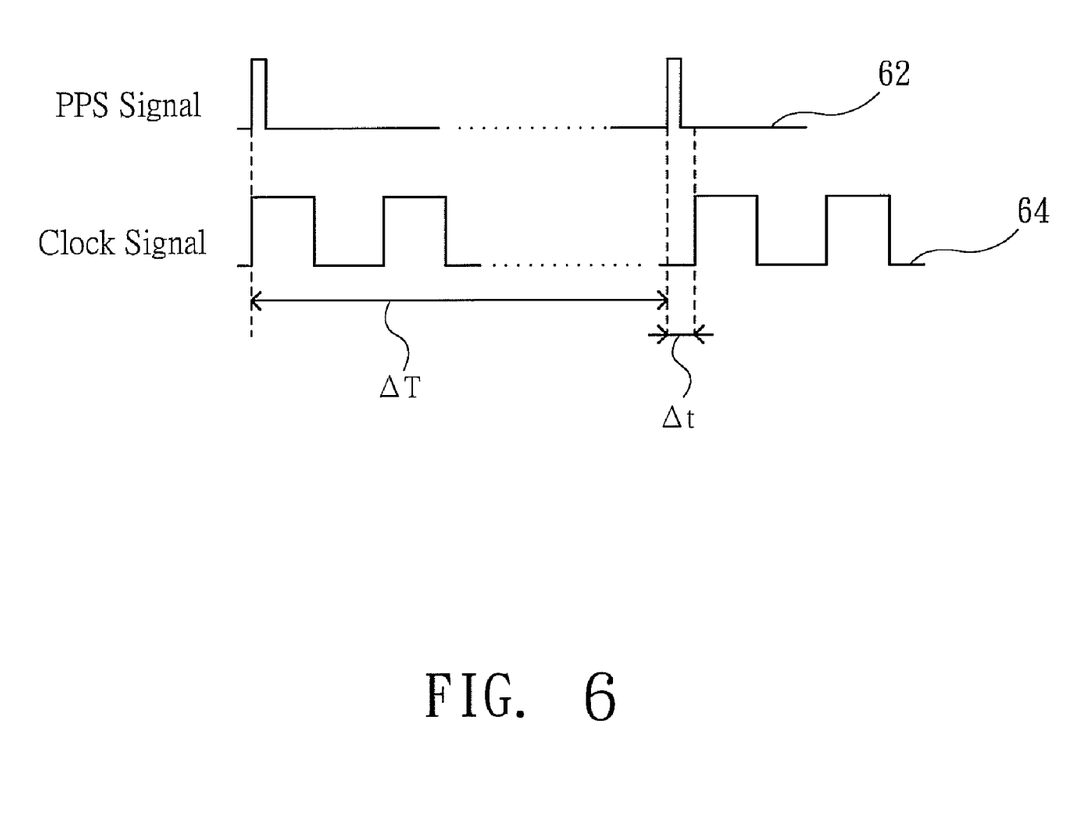
FIG. 6 is a diagram schematically showing a clock signal and a PPS signal in accordance with another embodiment of the present invention.

Please refer to FIG. 6 for a diagram schematically showing a clock signal and a PPS signal in accordance with one embodiment of the present invention. Since the oscillating frequency of the oscillator may drift with time and temperature, the clock signal 64 results in a small drift compared to the PPS signal 62 after a certain period of time even though the clock signal has been calibrated according to the drift per second.

As shown in FIG. 6, assume that the time interval from the previous PPS signal before the GPS receiver is turned off to the updated PPS signal is ΔT, and there is an updated drift Δt between the clock signal and the updated PPS signal.

The clock signal 64 is calibrated according to the previous drift per second. Therefore, as long as the updated drift Δt is not so significant, the previous drift per second is still effective. Accordingly, the compensation per second (updated drift per second) of the present invention is thus calculated using the following equation:

$$CPS_i = CPS_{i-1} + \alpha(\Delta t/\Delta T)$$

The compensation per scend (updated drift per second) is the sum of the previous drift per second ($CPS_0$) or compensation per second ($CPS_{i-1}$) and the average drift (Δt/ΔT) multiplied with a weight α. The weight α can be properly selected to improve accuracy of the calibrated clock signal. The weight α is preferably within a range from 0.05 to 0.2, depending on system requirement and environmental factors.

Furthermore, since the PPS signal generated right after the GPS receiver is turned on is not stable, the system may further comprise a PPS filter to select a proper PPS signal as a reference for calibrating the clock signal. The PPS filter compares the calibrated clock signal with the received PPS signal to obtain the proper PPS signal if the average drift (Δt/ΔT) between the PPS signal and the clock signal is smaller than a threshold value.

Experimentally, the threshold value is preferably within a range from 5 to 15 microseconds. The pre-determined time period for turning on the GPS receiver is preferably within a range from 2 to 5 minutes. Certainly, the threshold value can be adjusted according to the pre-determined time period for turning on the GPS receiver. The pre-determined time period is determined according to practical demands as well as environmental factors.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A system comprising a plurality of devices for time synchronization, wherein each device comprises:
    a global positioning system (GPS) receiver for receiving GPS signals to determine location and generate positioning information and a pulse per second (PPS) signal;
    an oscillator for generating a periodic signal;
    a microprocessor coupled to the GPS receiver and the oscillator for receiving the PPS signal and the periodic signal, the microprocessor comprising a timer for generating a clock signal according to the periodic signal; wherein the microprocessor generates a drift per second according to the difference between the PPS signal and the clock signal; and
    a wireless transceiver coupled to the microprocessor for transmitting the positioning information to the other devices and receiving positioning informations from the other devices;
    wherein the microprocessor turns off the GPS receiver and calibrates the clock signal constantly according to the drift per second, and then the GPS receiver is turned on after a pre-determined time period to update the drift per second and calibrate the clock signal with the updated drift per second, thereby forming cycle.

2. The system as recited in claim 1, further comprising a memory coupled to the microprocessor for recording the positioning information.

3. The system as recited in claim 2, wherein the microprocessor comprises a PPS filter for filtering a proper PPS signal to calibrate the clock signal.

4. The system as recited in claim 2, wherein the positioning information comprises the time when the location is determined, coordinates, and altitude.

5. The system as recited in claim 2, wherein the wireless transceiver transmits and receives data by time division multiple access (TDMA) technology.

6. The system as recited in claim 2, wherein the GPS receiver is turned off when it fails to determine location and is turned on after the pre-determined time period.

7. The system as recited in claim 2, wherein each of the devices for time synchronization further comprises a function module coupled to the microprocessor for performing a specific function.

8. A method for time synchronization, comprising steps of:
providing a global positioning system (GPS) receiver for receiving GPS signals to determine location and generate a pulse per second (PPS) signal;
providing an oscillator for generating a periodic signal;
providing a microprocessor coupled to the GPS receiver and the oscillator for generating a clock signal according to the periodic signal;
calculating a drift per second according to the difference between the PPS signal and the clock signal;
turning off the GPS receiver; and
calibrating the clock signal constantly according to the drift per second.

9. The method for time synchronization as recited in claim 8, wherein the step of calculating the drift per second comprises steps of:
recording the drift of each second of the clock signal according to the PPS signal within a time interval;
selecting a main drift range with the center at the drift value of highest count; and
obtaining the drift per second by dividing the sum of the drifts within the main drift range by the time interval.

10. The method for time synchronization as recited in claim 8, further comprising steps of:
turning on the GPS receiver after a pre-determined time period to determine location and generate the PPS signal;
calculating a compensation per second according to the difference between the PPS signal and the clock signal;
turning off the GPS receiver;
calibrating the clock signal constantly according to the compensation per second; and
turning on the GPS receiver after the pre-determined time period and forming cycle.

11. The method for time synchronization as recited in claim 10, wherein the step of calculating the compensation per second comprises steps of:
calculating the time interval between an updated PPS signal and the previous PPS signal;
calculating an updated drift of the clock signal according to the updated PPS signal;
obtaining an average drift by dividing the updated drift by the time interval;
obtaining an updated value by multiplying the average drift with a balance factor; and
obtaining an updated compensation per second by summing the previous compensation per second or the drift per second with the updated value.

12. The method for time synchronization as recited in claim 11, further comprising a step of providing a PPS filter for filtering a proper PPS signal.

13. The method for time synchronization as recited in claim 12, wherein the PPS filter filters the PPS signal by the steps of:
providing a threshold value; and
comparing the average drift according to the PPS signal with the threshold value, if the average drift is smaller than the threshold value, the PPS signal is a proper PPS signal.

14. The method for time synchronization as recited in claim 13, wherein the threshold value is within a range from 5 to 15 microseconds.

15. The method for time synchronization as recited in claim 11, wherein the balance factor is determined according to practical requirement and environmental factors.

* * * * *